United States Patent [19]
Ammar et al.

[11] Patent Number: 5,844,904
[45] Date of Patent: Dec. 1, 1998

[54] DIGITAL MESSAGE SWITCHING SYSTEM

[75] Inventors: Yousif Ammar, München; Gerald Hoefer, Langerringen; Michael Alger-Meunier, Haar, all of Germany

[73] Assignee: Siemens Aktiengesellschaft, Munich, Germany

[21] Appl. No.: 701,722

[22] Filed: Aug. 22, 1996

[30] Foreign Application Priority Data

Aug. 22, 1995 [DE] Germany ................ 195 30 857.3

[51] Int. Cl.$^6$ .................................................. H04L 12/28
[52] U.S. Cl. ...................... 370/420; 370/386; 370/396; 370/422
[58] Field of Search .................... 370/415, 416, 370/420, 421, 428, 434, 505, 386, 396, 422, 423

[56] References Cited

U.S. PATENT DOCUMENTS

| | | | |
|---|---|---|---|
| 4,881,223 | 3/1988 | Debuysscher | 370/398 |
| 4,970,720 | 3/1989 | Esaki | 370/41 |
| 4,975,901 | 12/1986 | Poli | 370/360 |
| 5,617,467 | 3/1994 | Bacher et al. | 370/496 |

*Primary Examiner*—Chi H. Pham
*Assistant Examiner*—Steven Nguyen
*Attorney, Agent, or Firm*—Herbert L. Lerner; Laurence A. Greenberg

[57] ABSTRACT

A digital message switching system includes at least one digital message switching unit and a plurality of subordinate units each being coupled to the respective switching unit through a respective transmission link. In order to signal a request of a subordinate unit to transmit, that unit first sends at least one message of meaningless content to a higher-ranking unit and only then sends messages of meaningful content.

9 Claims, 2 Drawing Sheets

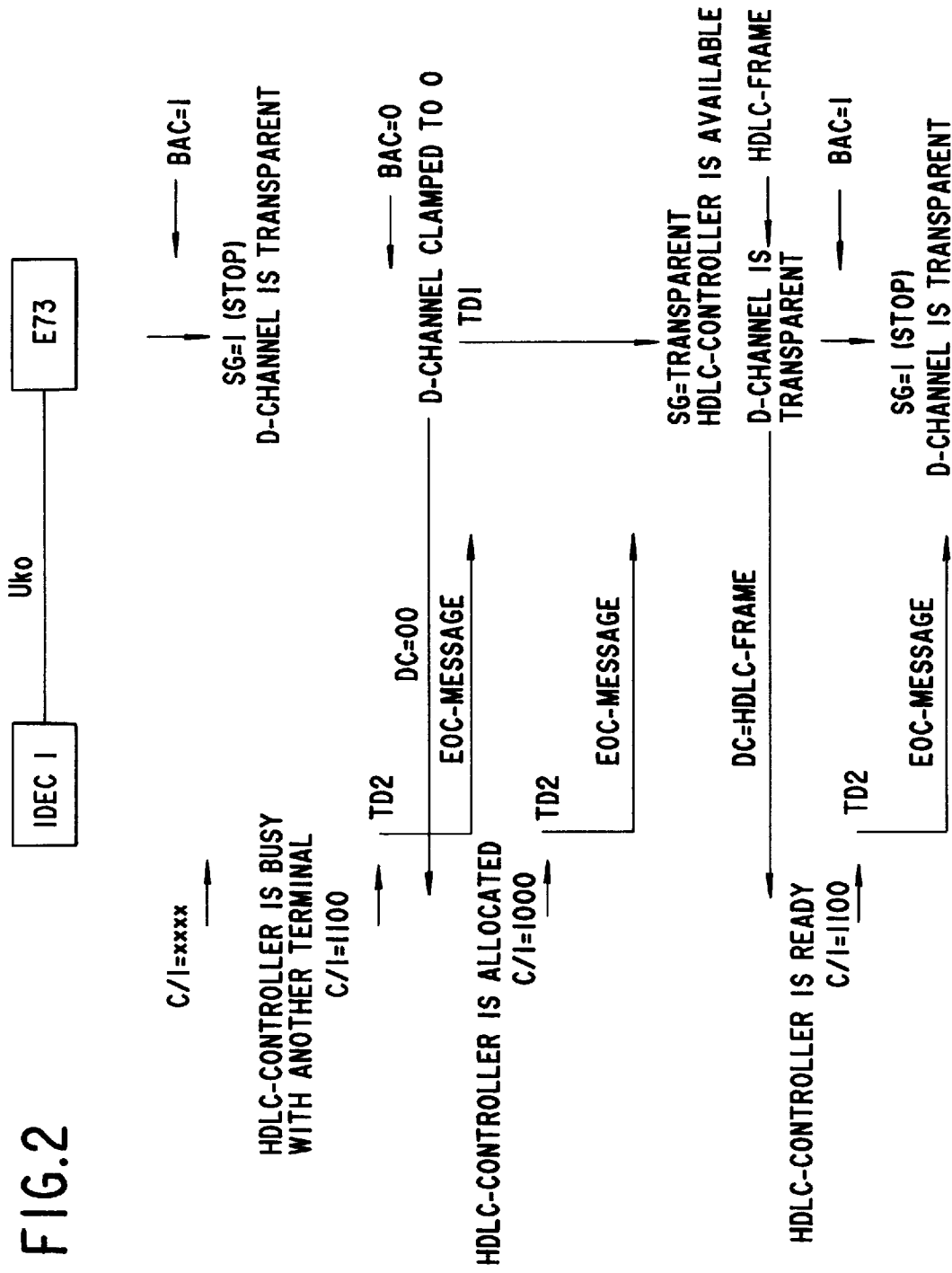

DIGITAL MESSAGE SWITCHING SYSTEM

BACKGROUND OF THE INVENTION

FIELD OF THE INVENTION

The invention relates to a digital message switching system having at least one digital message switching unit and a plurality of subordinate units each coupled to the respective switching unit through a respective transmission link.

Digital message switching systems become more economical as they include more terminals. Signals to be transmitted are therefore bundled stepwise and can thus be disposed and distributed in an applicable bundling plane (hierarchical level) as needed. Typically, modern digital message switching systems are therefore hierarchically organized computer-controlled systems, which receive data from the various terminals and evaluate, condition and/or send the data on to some other unit.

A distinction is made between types of data. On one hand are line-switched data, which are transmitted for a certain period of time from one terminal to another. That option is chosen for high-priority speech transmission, for instance, but is often ineffective for general data transmission, since it makes only partial use of available transmission links. On the other hand are therefore packet-switched data, which are buffer-stored as needed from one bundling plane, by choosing a suitable possible transmission route between the various terminals, in order to achieve high utilization of the transmission links.

The option of transmitting both packet-switched and line-switched data is offered by digital, universal narrow-band networks, such as the Integrated Services Digital Network (ISDN). In the ISDN, access to various communications services is gained through so-called protocols, which are defined in applicable recommendations of the Comitté Consultatif International Télégraphique et Téléfonique (CCITT). Those protocols are exchanged over data channels (D-channels), by way of which additional signaling information can also be transmitted. The signaling information includes, among other things, control information from the terminal for the message switching system or for another terminal. They also include information for switching channels (B-channels) for transmitting line-switched data.

D-channel switching units are typically used in order to evaluate signaling data in the ISDN. Besides serial connection logic needed for triggering the transmission link, they have one timing, switching and collision control circuit and one transmitter/receiver unit per D-channel. One such switching unit is described, for instance, as a component PEB 2075 in The Siemens Data Book, ICs for Communication, Edition 2/89, pp. 332–354. That known switching unit is constructed for four D-channels and is made with integrated circuit technology. There are limits to the number of D-channels in that component, above all because of the requisite high expense for circuitry involved. Consequently the expense for circuitry for the switching systems rises as well.

A lower-cost digital message switching system can be found, for instance, in German patent DE 41 41 493 C. It includes a digital message switching unit to which a plurality of subordinate units are connected, each through one transmission link. The message switching unit in turn includes a receiving unit, which evaluates the signals supplied to it and conditions them for further processing. The receiving unit is preceded by a switching unit that is coupled to the transmission links and that switches one of the transmission links through to the receiving unit as a function of a control signal. A monitoring unit which is also coupled to the transmission links detects the appearance of transmission signals from the subordinate units on the various transmission links and outputs information signals accordingly. A selection unit which is coupled to the monitoring unit, the switching unit and the transmission links acts as a function of the information signals of the monitoring unit to select one of the transmission links according to certain criteria and generates corresponding control signals for the switching unit and the subordinate units. If a subordinate unit wishes to transmit, it begins to transmit the first message. Before the first message has been sent in full, if transmission at that time is not (yet) possible, the higher-ranking switching unit must send a signal to the subordinate unit to prevent the first message from being lost. That is, if the signal arrives punctually, the first message is stopped and then re-sent or delayed until such time as a transmission is possible. If the signal does not arrive at the subordinate unit, or arrives too late, then repeating the already completely sent messages is no longer possible, and therefore they are lost. Accordingly, in a digital message switching system of the type referred to at the outset, only transmission links and message switching units having a total reaction time which is shorter than the shortest messages to be sent by the subordinate terminal can be used.

SUMMARY OF THE INVENTION

It is accordingly an object of the invention to provide a digital message switching system, which overcomes the hereinafore-mentioned disadvantages of the heretofore-known devices of this general type and in which reaction times of a transmission link and message switching units together can be longer than the shortest message of a subordinate unit.

With the foregoing and other objects in view there is provided, in accordance with the invention, a digital message switching system, comprising at least one digital message switching unit; a plurality of transmission links; and a plurality of subordinate units each being coupled through a respective one of the transmission links to a respective switching unit, the subordinate units signaling a request or wish to transmit by initially sending at least one message of meaningless content to a higher-ranking unit and only then sending messages of meaningful content.

In accordance with another feature of the invention, the digital message switching unit includes a receiving unit for evaluating signals supplied to it and conditioning the signals supplied to it for further processing; a switching unit connected upstream of the receiving unit and coupled to the transmission links for switching through one of the transmission links to the receiving unit as a function of a control signal; a monitoring unit coupled to the transmission links for detecting an appearance of transmission signals of the subordinate units on the transmission links and outputting information signals accordingly; and a selection unit coupled to the monitoring unit, the switching unit and the transmission links and operating as a function of the information signals of the monitoring unit for selecting one of the transmission links according to given criteria and generating control signals accordingly for the at least one switching unit and the subordinate units.

In accordance with a further feature of the invention, a reaction of one of the subordinate units to a message from the at least one message switching unit that the at least one message switching unit is busy with a different subordinate unit is delayed by a first delay period being at least equal to twice a duration of a message frame.

In accordance with an added feature of the invention, a second delay period being at least equal to a reaction time of the at least one message switching unit delays messages sent by the at least one message switching unit.

In accordance with an additional feature of the invention, at least one of the subordinate units is a further digital message switching unit.

In accordance with yet another feature of the invention, the subordinate units not selected by the selection unit cease a transmission mode for a given length of time, on the basis of control signals output by the selection unit.

In accordance with yet a further feature of the invention, one of the subordinate units selected by the selection unit is blocked by a corresponding control signal for a given length of time after a conclusion of a transmission mode.

In accordance with yet an added feature of the invention, a criterion for selection of one of the subordinate units is an order in which a transmission mode is taken up in the subordinate units.

In accordance with yet an additional feature of the invention, a plurality of data channels are transmitted by time-division multiplexing between the subordinate units and the digital message switching unit.

In accordance with a concomitant feature of the invention, there is provided a data processing unit connected downstream of the receiving unit.

Other features which are considered as characteristic for the invention are set forth in the appended claims.

Although the invention is illustrated and described herein as embodied in a digital message switching system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a chart showing a course of taking up a transmission in the message switching system of FIG. 1.

DESCRIPTION OF THE PREFERRED EMBODIMENTS

Figure 1:
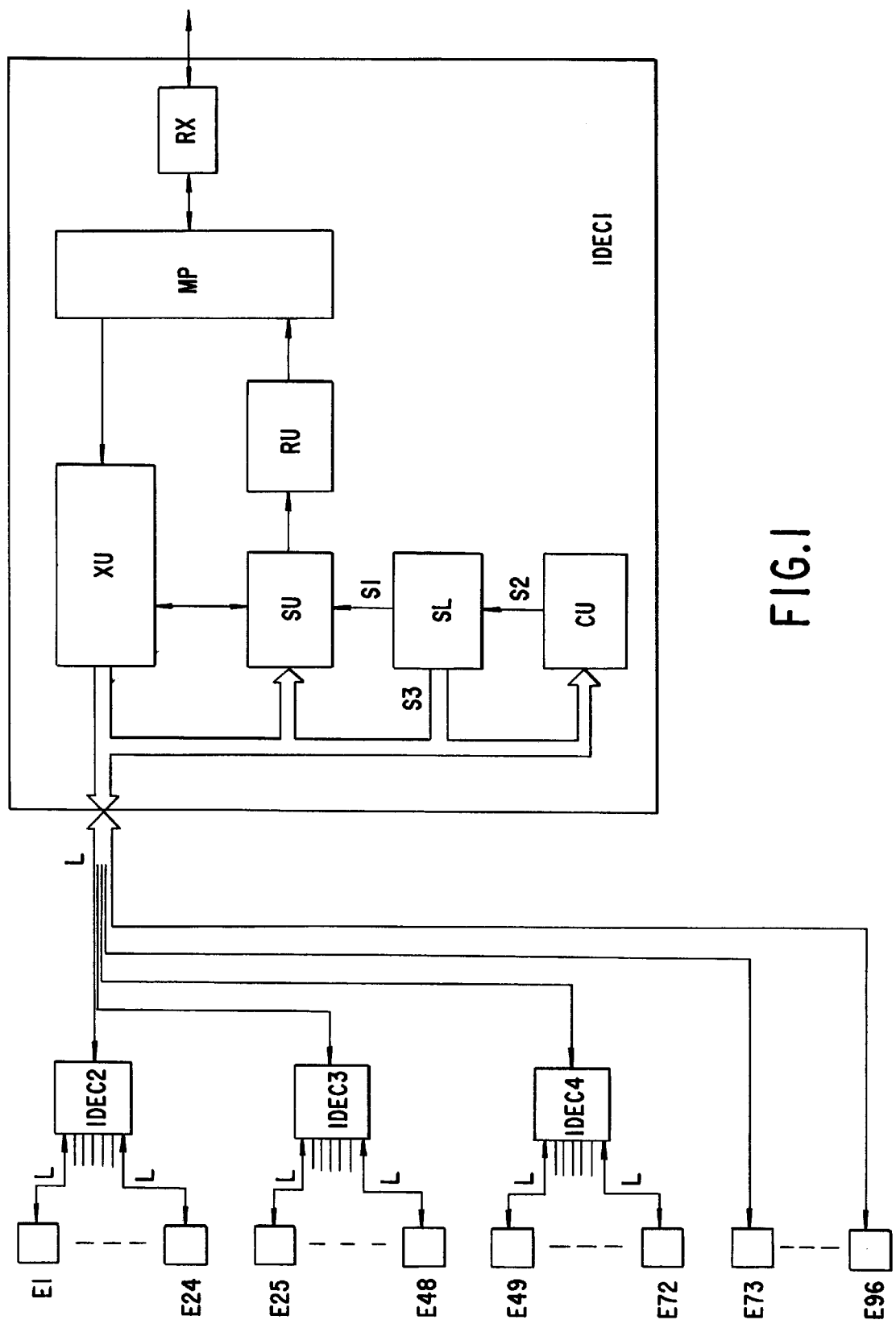
FIG. 1 is a block circuit diagram of one embodiment of a digital message switching system according to the invention.

Referring now to the figures of the drawings in detail and first, particularly, to FIG. 1 thereof, there is seen a digital message switching system according to the invention in which four digital message switching units IDEC1–IDEC4 are provided. The message switching units IDEC1–IDEC4 are all constructed identically. Therefore, only the message switching unit IDEC1 will be described in further detail below, to represent them all. The message switching unit IDEC1 is coupled to a plurality of subordinate units, in the present case 24 of them, each through a respective transmission link. Terminals E73–E96 on one hand, and the further message switching units IDEC2–IDEC4 on the other hand, function as subordinate units. Three sets of 24 terminals E1–E24 and E25–E48 and E49–E72 are in turn connected to the further message switching units IDEC2–IDEC4, each through a respective transmission link. In the drawing, the transmission links are generally identified by the letter L and they include, among other elements, not only the transmission lines but also the requisite devices for line adaptation, primarily encoding and decoding devices as well as transmission and reception amplifiers. Alternatively, however, these may be radio links and so forth, with the requisite devices for that purpose.

The message switching unit IDEC1 includes a receiving unit RU, which evaluates signals supplied to it and conditions them for further processing, for instance by a microprocessor unit MP and a transmitter/receiver device RX connected to it. The receiving unit RU is preceded by a switching unit SU that is coupled to the transmission links L and that couples one of the transmission links L to the receiving unit RU as a function of a control signal S1. A monitoring unit CU which is also provided, is coupled to the transmission links L and detects the appearance of transmission signals from the subordinate units IDEC2–IDEC4, E73–E96 over the various transmission links L and outputs information signals S2 accordingly. These signals are delivered to a selection unit SL, which is coupled to the monitoring unit CU, the transmission links L and the switching unit SU and which, as a function thereof and according to certain criteria, selects one of the transmission links L and generates the corresponding control signals S1 for the switching unit SU and control signals S3 for the subordinate units IDEC2–IDEC4, E73–E96. The message switching unit IDEC1 moreover also includes a transmission device XU, which is connected between the transmission links L and the microprocessor unit MP but which is not definitive for the purposes of the observations below and will therefore not be described in further detail.

Once one of the subordinate units IDEC2–IDEC4, E73–E76 has been selected by the selection unit SL, then through the use of suitable control signals, on one hand the subordinate units which are not selected are blocked for the duration of the transmission mode of the selected subordinate units, and on the other hand after the conclusion of the transmission mode, the selected subordinate unit is blocked for a certain length of time. The order in which the transmission mode is taken up in the subordinate units IDEC2–IDEC4, E73–E86 is, for instance, used as the criterion for the selection of a subordinate unit. Each of the subordinate units IDEC2–IDEC4, E73–E96 then begins the transmission mode immediately, as soon as that is necessary. If another subordinate unit has already been selected, because it had already begun its transmission mode, then a corresponding signal is transmitted to the subordinate unit that took up the transmission mode later, whereupon this later subordinate unit stops its transmission mode and resumes it again at a later time. In the event that two or more subordinate units begin the transmission mode simultaneously, then a priority plan stored in memory in the selection unit SL is consulted and followed.

In the event that the reaction time of the transmission line L and the message switching unit IDEC1 is longer than the shortest message sent by a subordinate unit, then to prevent loss of this message the particular subordinate unit first sends a message having a content which has no meaning whatever, and the loss of which will cause no loss of information to be transmitted. In order to further increase the allowable reaction time, on one hand the first message may be made relatively long, and on the other hand several meaningless messages may be sent if needed at the beginning. This "dummy message" may be a certain bit combination, which enables it to be identified as such by the higher-ranking message switching unit IDEC1. This latter unit is constructed to suit this purpose. Moreover, two delay units may be provided, one of which is intended to compensate for the transit time of the transmission device and the other of which serves as a waiting period until the status of the higher-ranking message switching unit is reliably fixed.

According to the invention, a digital message switching unit having a signal receiving unit uses the signaling channels, or D-channels, of a plurality of terminals, for instance 24 of them. For example, HDLC-based transmission protocols (HDLC=High Level Data Link Control) in the full duplex mode, such as LAP-D, are used. In the transmission direction, the requisite sequentialization of the data transmission occurs automatically. In the reception direction, this is guaranteed by the selection unit SL and one additional control channel. The selection unit SL uses the control channel in order to allocate the signaling channel to the terminals or deallocate it. One control channel is available for each terminal. It is operated unidirectionally, in a master-and-multi-slave configuration. The terminals (slaves) are informed through this control channel by the selection unit (master) whether or not they are allowed to transmit over the signaling channel. The control channel, like the signaling channel, is passed transparently through all of the interfaces. The bit error probability on the control channel can be reduced if desired by using last-look methods. A control unit, such as the microprocessor MP, communicates with the terminals IDEC2–IDEC4, E73–E96 over the associated signaling channels. In the transmission direction, the sending port time slot and time slot length can be programmed freely. Thus the microprocessor MP can address arbitrary terminals sequentially. In the reception direction, an external signal, such as the so-called strobe signal which selects the reception port time slot, is evaluated. This strobe signal is generated by the selection unit.

The selection unit SL allocates one subordinate unit IDEC1–IDEC4, E73–E96 at a time to the reception unit RU. Through the control channel, it tells the subordinate units IDEC2–IDEC4, E73–E96 whether the respective signaling channels are available or are blocked. After system initialization, all of the signaling channels are blocked. Once a subordinate unit has successfully performed an activation procedure, for instance, it is put on a request list by the selection unit. First, all of the subordinate units that are carried in this list are told the availability of their signaling channels. As soon as the first subordinate unit begins to transmit, the receiving unit RU is synchronized to the transmitting subordinate unit through the use of the strobe signal, and the signaling channels of all of the other subordinate units are blocked. If more than one subordinate unit begins to transmit at the same time, then the selection unit decides, on the basis of a priority plan, to whom the signaling channel will be allocated, or from whom it will be deallocated. At the same time it is assured that if more than one subordinate unit is transmitting, each subordinate unit will have a turn before any subordinate unit is activated for a second time. The individual channels are transmitted by time-division multiplexing.

A subordinate unit first indicates it status, through the use of a bus access bit BAC transmitted in the most recently transmitted IOM frame (IOM=ISDN-Oriented Modular), in combination with a message sent over the integrated operation channel EOC (EOC=Embedded Operation Channel). This produces a certain behavior of a stop-and-go bit SG (SG=Stop/Go), with the consequence that in a first logic state 0 of the bus access bit BAC, the stop-and-go bit SG is switched to be transparent, preferably after a delay period after the transition of the bus access bit BAC to the first logic state 0 elapses, while the D-channel leading to the higher-ranking message switching unit is kept at the first logic state 0 without any delay. If the bus access bit BAC is at a second logic state 1, then the stop-and-go bit SG is set to a logic state representing the stop status, and the D-channel leading to the higher-ranking message switching unit is switched to be transparent, with the former logic state in the D-channel initially still being transmitted.

For instance, if a bus access bit BAC set to the logic state 1 is received by the higher-ranking message switching unit from a subordinate unit over the data input channel, then over the data output channel the message switching unit sets the stop-and-go bit SG in the next IOM frame to the stop position, such as the second logic state 1. The D-channel is transparent. By setting the bus access bit BAC to the first logic state 0, the terminal signals that it wants to use the D-channel to the higher-ranking message switching unit and to request a line module from the HDLC controller of the higher-ranking unit. This causes the D-channel to send bits having the first logic state 0 in the direction of the higher-ranking message switching unit, beginning with the next IOM frame. This means that the stop-and-go bit blocks the onset of transmission. After a delay period of 1.5 ms plus two EOC frames, the stop-and-go bit SG becomes transparent and thus reproduces the most recently attained status. The arriving bits that each have the first logic state 0 are ready on the line module for the higher-ranking message switching unit that is assigned to the subordinate unit. This higher-ranking message switching unit then indicates the assignment to this subordinate unit by a suitable EOC message, which sets the stop-and-go bit SG to the first logic state 0. The D-channel continues to send the first logic state 0 to the higher-ranking message switching unit until data from the higher-ranking message switching unit arrive at the data input. An HDLC frame, which begins with a first bit at the first logic state 0 on the D-channel, returns the D-channel to the transparent operating mode. This allows arbitrary delays between the transition of the first stop-and-go bit SG to the first logic state 0 and the moment when the D-channel is used, without the risk of losing the HDLC controller by sending an interrupt request that, for example, includes solely bits at the second logic state 1. At the end of an HDLC frame, the bus access bit BAC is reset to the second logic state 1. As a consequence, the stop-and-go bit SG is also set to the second logic state 1, and as a result the D-channel is blocked for further transmissions until such time as the HDLC controller is again requested.

FIG. 2 schematically illustrates the case in which a subordinate unit, for instance the subordinate unit E73, outputs a request to the higher-ranking message switching unit, for instance the message switching unit IDEC1, through a connection Uko. Initially the bus access bit BAC at the data input of the D-channel is set to the second logic state 1. The result is that the stop-and-go bit SG is in the stop position, namely the second logic state 1. The higher-ranking message switching unit IDEC1 can send a code word C/I of arbitrary content (xxxx). In order to request access to the higher-ranking message switching unit IDEC1, the subordinate unit E73 sets the bus access bit BAC at the input to the D-channel DC to the first logic state 0. The consequence of this is that the D-channel DC is clamped to the first logic state 0 in the direction of the higher-ranking message switching unit IDEC1, and the stop-and-go bit SG is set to the second logic state 1. The clamping to the first logic state 0 produces a "dummy message" made up only of zeros, lacking any meaningful content. The higher-ranking message switching unit IDEC1 reacts to the sending of the first logic state 0 by assigning its HDLC controller to this terminal E73. This is indicated by the change of the code word C/I in the direction of the subordinate unit E73, for instance from "1100" to "1000". Consequently, after a first delay time, the stop-and-go bit SG is set to the first logic state 0. The D-channel is reset in the direction of the subordinate unit E73 solely by the transition from being clamped to the first logic state 0 to being in the "transparent" state at the beginning of an HDLC frame arriving at the data input. This HDLC frame is transmitted in the direction of the higher-ranking unit IDEC1. At the end of the frame, the bus access bit BAC is set to the second logic state 1. This can be carried out, for instance, by a layer-2 controller (such as SMARTLINK, ICC, MBMC). As a consequence, the stop-and-go bit SG is set to the second logic state 1 in the next IOC frame, which stops any second HDLC frame that might have been sent and that could not be processed in the higher-ranking unit IDEC1. Once the higher-ranking unit IDEC1 has completed the processing of the HDLC frame, it changes the code C/I to "1100". After a second delay period TD2, the code is transmitted to the subordinate unit E73, with the effect that the stop-and-go bit SG remains in the stop position, regardless of the bus access bit BAC.

The delay periods TD1 and TD2 are obtained as follows:

The delay period TD2 is obtained from a time interval of 6 ms, for example, in which an EOC message can be transmitted, for instance, through a Uko interface. Accordingly, since an EOC message can be sent only every 6 ms, and the transmission takes 6 ms, the delay period TD2 for the "worst case" scenario should thus be 12 ms. The delay period TD2 accordingly reflects the transit time along the transmission link L.

The delay period TD1 is 13.5 ms at maximum, for instance, and 7.5 ms at minimum, depending on the disposition of the super frame at the moment when the HDLC controller is requested by the subordinate unit E73. This delay period is necessary because, if the HDLC controller has already been allocated to another participant, then instead of receiving an EOC message "start" as requested, the subordinate unit E73 might equally likely receive the EOC message "stop". The HDLC controller, which is busy with another subordinate unit before the bus access bit is set, arrives in the form of a wrong EOC message at the subordinate unit E73. Only the second possible EOC message reliably reproduces the requested status.

In closing, it should be pointed out that a plurality of units, such as the receiving unit RU, the switching unit SU, the selection unit SL and the microprocessor MP, can be constructed in a single unit, such as a signal processor. Moreover, it is also possible to combine the signaling channel and the control channel into a single channel. Depending on the particular application, the delay periods as well as the type and makeup of the meaningless messages can be varied.

We claim:

1. A digital message switching system, comprising:
   at least one digital message switching unit;
   a plurality of transmission links;
   a plurality of subordinate units each being coupled through a respective one of said transmission links to said at least one switching unit, said subordinate units signaling a request to transmit by initially sending at least one message of meaningless content to a higher-ranking unit and then sending messages of meaningful content; and
   one of said subordinate units delaying a reaction to a message from said at least one message switching unit that said at least one message switching unit is busy with a different subordinate unit, by a delay period at least equal to twice a duration of a message frame.

2. The digital message switching system according to claim 1, wherein said digital message switching unit includes:
   a receiving unit for evaluating signals supplied to it and conditioning the signals supplied to it for further processing;
   a switching unit connected upstream of said receiving unit and coupled to said transmission links for switching through one of said transmission links to said receiving unit as a function of a control signal;
   a monitoring unit coupled to said transmission links for detecting an appearance of transmission signals of said subordinate units on said transmission links and outputting information signals accordingly; and
   a selection unit coupled to said monitoring unit, said switching unit and said transmission links and operating as a function of the information signals of said monitoring unit for selecting one of said transmission links according to given criteria and generating control signals accordingly for said at least one switching unit and said subordinate units.

3. The digital message switching system according to claim 1, wherein another delay period being at least equal to a reaction time of said at least one message switching unit delays messages sent by said at least one message switching unit.

4. The digital message switching system according to claim 1, wherein at least one of said subordinate units is a further digital message switching unit.

5. The digital message switching system according to claim 2, wherein said subordinate units not selected by said selection unit cease a transmission mode for a given length of time, on the basis of control signals output by said selection unit.

6. The digital message switching system according to claim 2, wherein one of said subordinate units selected by said selection unit is blocked by a corresponding control signal for a given length of time after a conclusion of a transmission mode.

7. The digital message switching system according to claim 1, wherein a criterion for selection of one of said subordinate units is an order in which a transmission mode is taken up in said subordinate units.

8. The digital message switching system according to claim 1, wherein a plurality of data channels are transmitted by time-division multiplexing between said subordinate units and said digital message switching unit.

9. The digital message switching system according to claim 2, including a data processing unit connected downstream of said receiving unit.

* * * * *